United States Patent [19]

Summers

[11] 4,162,055
[45] Jul. 24, 1979

[54] COPYHOLDING DEVICE

[76] Inventor: Rodney Summers, 9200 Gale Rd., Pontiac, Mich. 48054

[21] Appl. No.: 860,600

[22] Filed: Dec. 14, 1977

[51] Int. Cl.² ............................................. F16M 13/00
[52] U.S. Cl. .................................... 248/441 R; 403/71; 403/258
[58] Field of Search ............ 248/19, 24, 441 R, 442.2; 403/71, 258

[56] References Cited

U.S. PATENT DOCUMENTS

| 794,099 | 7/1905 | Heaney | 248/444.2 |
| 2,225,093 | 12/1940 | Avery | 248/24 |
| 2,625,908 | 1/1953 | Knott | 248/444.2 |
| 3,385,617 | 5/1968 | Gehring | 403/258 |
| 3,799,625 | 3/1974 | Statz | 403/258 |

Primary Examiner—William H. Schultz
Attorney, Agent, or Firm—Harness, Dickey & Pierce

[57] ABSTRACT

A copyholding device is disclosed of the type having a generally flat, rectangular base assembly intended to underly an associated typewriter or the like; the base assembly operatively supports the lower end of an upright pivotable support column, the upper end of which carries an easel-like support platform which functions to carry worksheets or the like that are to be copied with the typewriter.

1 Claim, 6 Drawing Figures

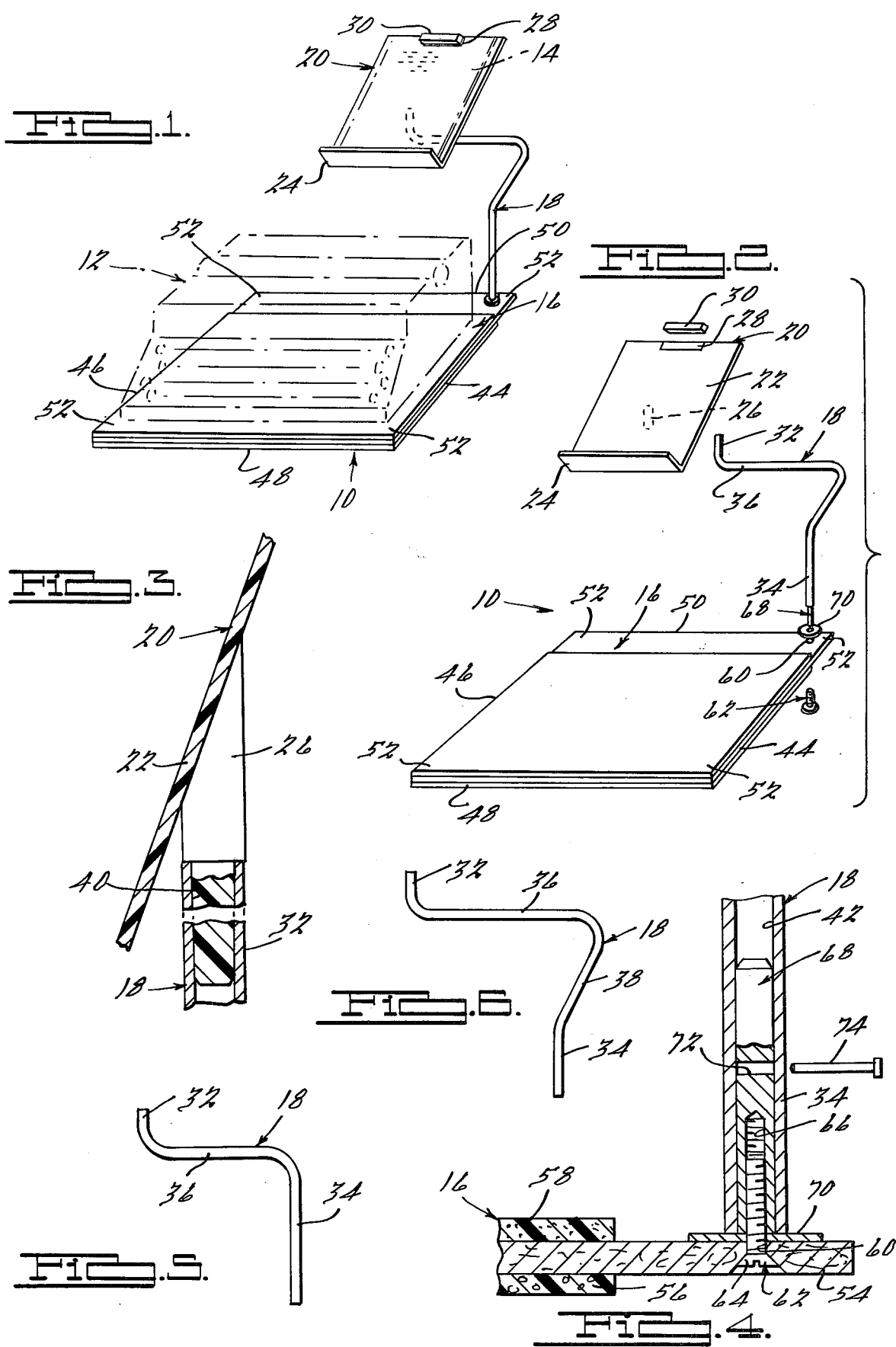

COPYHOLDING DEVICE

BACKGROUND AND SUMMARY OF THE INVENTION

The present invention relates generally to copyholder devices and more particularly, to a new and improved copyholder which embodies a base assembly upon which an associated typewriter can be mounted. It is accordingly a general object of the present invention to provide a new and improved copyholding device of the type that may be operatively associated with typewriters and similar apparatus.

It is a more particular object of the present invention to provide a new and improved copyholder device which includes a pivotally mounted support column, the upper end of which carries an easel-like support platform that operatively supports the work material to be copied.

It is still a more particular object of the present invention to provide a copyholder device of the above character wherein the support platform is telescopically connected to the upper end of the support column, and wherein the entire assembly can be conveniently assembled and disassembled for purposes of packaging, storage, transport, and the like.

It is yet another object of the present invention to provide a new and improved copyholder device of the above character wherein the base assembly includes sound absorbing means and means to prevent the assembly and typewriter mounted thereon from sliding upon the associated support surface.

It is a further object of the present invention to provide a copyholder device, as above described, wherein the workpiece support platform is fabricated of a molded polymeric material and which may be provided with magnet means for detachably securing paperwork thereon during a copying operation.

It is still another object of the present invention to provide a copyholder device of the above character that is of a relatively simple and straightforward design and therefore, may be economically manufactured and will have a long and effective operational life.

It is yet another object of the present invention to provide a copyholder device that has interchangeable support columns to be used with different types of typewriters, and as such, said device will find universality of application.

Other objects and advantages of the present invention will become apparent from the following detailed description taken in conjunction with the accompanying drawings.

BRIEF DESCRIPTION OF THE DRAWINGS

FIG. 1 is an elevated perspective view of the copyholder device of the present invention, as shown in typical operable association with a typewriter or the like depicted in phantom lines;

FIG. 2 is an exploded assembly view of the copyholder device shown in FIG. 1;

FIG. 3 is an enlarged fragmentary cross-sectional view of the interconnecting structure between the support platform and support column of the copyholder device of the present invention.

FIG. 4 is an enlarged fragmentary cross-sectional view of the pivot pin structure utilized in pivotably mounting the support column upon the base assembly of the present invention; and FIGS. 5 and 6 illustrate alternate embodiments of the support column that can be utilized with the copyholder device of the present invention.

DETAILED DESCRIPTION OF THE PREFERRED EMBODIMENTS

Referring now in detail to the drawings and in particular to FIG. 1 thereof, a copyholder device 10, in accordance with one preferred embodiment of the present invention, is shown in operative association with a typical typewriter or similar apparatus 12 which may be used in copying or otherwise working with worksheets or papers, representatively designated by the numeral 14. Generally speaking, the copyholder device 10 comprises a base assembly 16 which underlies the typewriter 12, an upwardly extending support column 18, and a generally easel-like paper work support platform, generally designated 20. As will hereinafter be described in detail, the work papers 14 are intended to be placed upon and be supported by the platform 20 which may be pivotably biased to any desired position relative to the typewriter 12 to permit the operator to conveniently view the papers 14 during copying or other consideration thereof.

As best seen in FIGS. 2 and 3, the support platform 20 comprises a generally flat or planar back section 22 that is of rectangular shape and is provided with an outwardly projecting flange or support lip 24 along the lower edge thereof. The rearward side of the back section 22 is formed with a generally cylindrically-shaped boss portion 26, the axis of which is inclined relative to the plane of the back section 22 such that when said axis is oriented generally vertically, the section 22 is inclined so the work papers 14 resting upon the lip 24 will be retained upon the support platform 20. In order to aid in supporting or retaining the papers 14 upon the platform 20, the back section 22 thereof may be provided with a metal strip or plate 28 that is cooperable with an associated bar magnet or the like 30 for securing work papers therebetween. Of course, various alternative retaining means may be associated with the support platform 20 without departing from the scope of the present invention. The platform 20 is preferably, although not necessarily, fabricated of a molded polymeric material, such as molded plastic. Conventional injection molding techniques will be found highly satisfactory in producing an economical and pleasant appearing structure wherein the sections 22, 24 and 26 are all integral of one another.

Referring now in detail to the support column 18, said member is preferably constructed of tubular workstock which is appropriately formed so as to define vertically spaced upper and lower vertically extending end sections 32 and 34, respectively. Disposed between and interconnecting the end sections 32 and 34 is a generally horizontally oriented intermediate section 36 (see FIG. 5) and/or an arcuate section 38 (see FIG. 6) to provide the desired horizontal or lateral offset between the end sections 32 and 34. The length and/or configuration of the intermediate sections 36, 38 may be varied in accordance with the particular size and style typewriter 12 with which the device 10 is to be associated, and it is contemplated that the device 10 could be marketed with two different support columns 18, such as those shown by way of example in FIGS. 5 and 6, which would be compatible with the most popular types of typewriters.

As best shown in FIGS. 3 and 4, the upper and lower end sections 32 and 34 of the support column 18 are formed with internal bores or annular recesses 40 and 42, respectively, the former of which is intended to telescopically receive the cylindrical boss portion 26 formed on the rearward side of the support platform 20. Preferably, the boss portion 26 is received within the bore 40 with a slight interference fit, whereby to permit relative pivotal movement between the support platform 20 and the column 18 when a small amount of pivoting force is applied thereto, yet preventing relatively free movement of the platform 20 upon the column 18. It should be appreciated that the male-female relationship between the components 26 and 18 could be reversed without departing from the scope or fair meaning of the present invention.

As best shown in FIGS. 1, 2 and 4, the base assembly 16 is of a generally rectangular configuration and is defined by side edges 44, 46, a front edge 48 and a rearward edge 50, the intersecting edges defining four corner areas, generally designated by the numeral 52. The assembly 16 is fabricated in a laminated construction which consists of an intermediate layer or structure 54 that is formed of a relatively rigid material, such as fiberboard. Disposed below the layer 54 is a layer 56 of a relatively soft and resilient material, such as a compliant plastic foam, for example urethane foam, which provides a non-skid or slip lower surface to prevent movement between the assembly 16 and typewriter 12 carried thereon with respect to the underlying support surface (not shown), such as might be provided by a desk or table top. The upper layer or laminant of the assembly 16 is designated by the numeral 58 and is fabricated of a material similar to that of the layer 56, but which is considerably less resilient or compliant as compared to the layer 56. The upper layer 58 is intended to function as a cushioning element for the typewriter 12 placed thereon and cooperates with the other layers 54, 56 in acting as a sound absorbing or attenuating medium so as to minimize the noise attendant operation of the typewriter 12, particularly if it is of the automatic or so-called word processing variety. The layers 54, 56 and 58 may be secured together to form a unitized structure by any suitable means, such as by any suitable adhesive or the like.

As best seen in FIGS. 2 and 4, the intermediate layer 54 of the base assembly 16 extends rearwardly a short distance beyond the upper and lower layers 58 and 56, and one rearward corner area 52 thereof is formed with an opening 60 within which an upwardly projecting threaded fastener element or screw 62 is inserted. The screw 62 is formed with an enlarged diameter head portion 64 received with a counterbore on the underside of the layer 54, with the screw 62 being selectively threadably engageable within a threaded blind bore 66 formed in the lower end of a generally vertically disposed pivot element or pin 68. If desired, a suitable washer element or the like 70 may be interposed between the lower end of the element 68 and the upper side of the member 54, and the element 68 may be provided with a cross bore 72 within which a removable pin 74 may be inserted to facilitate holding of the pivot element 68 when the screw 62 is being secured within the bore 66 thereof. The cross-sectional size or diameter of the pivot element 68 is selected such that the upper end of the element 68 may be nestingly or telescopically received within the bore 42 provided in the lower end section 34 of the support column 18, whereby to permit the column 18 to be selectively pivoted about a generally vertical axis defined by the element 68 so that the support platform 20 and work papers 14 thereon may be positioned at desired locations which enable optimum viewing of the papers 14 by the typewriter operator during a copying operation. An interference fit is preferrably provided between the element 68 and the bore 42, and. If desired, a small amount of lubricant may be utilized to facilitate effortless assembly and positioning of the column 18 and platform 20 relative to the base assembly 16.

Assembly and use of the present invention will be evident from the foregoing description thereof. It should be appreciated, of course, that assembly, as well as disassembly, will be extremely convenient so as to facilitate packaging, etc. It should also be noted that the base assembly 16 may have more than a single opening 60 formed at different locations therein in order to optimize the positioning of the support column 18 with respect to the associated typewriter or the like 12. By virtue of the extremely simplified construction of the present invention, manufacturing costs thereof will be minimized to the extreme, as will the possibility of failure due to malfunctioning or the like. Accordingly, the copyholder device 10 will have a long and effective operational life.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A coypholding device comprising,
    a generally flat base assembly adapted to have a typewriter or similar apparatus mounted thereon,
    said base assembly being of a multiple layer construction including a relatively rigid intermediate layer, a lower relatively soft and compliant layer providing an acoustical barrier, and an upper layer that is also of a soft and compliant nature but which is not as soft and compliant as said lower layer and is intended to limit movement of said typewriter or similar apparatus relative to said base assembly,
    said intermediate layer extending outwardly from the adjacent edges of said upper and lower layers at one side of said base assembly and defining a projecting flange portion,
    said flange portion having an opening formed at one end thereof through which an upwardly extending fastening element is disposed,
    a pivot pin fixedly secured to the upper side of said flange portion by said fastening element,
    a support column secured at the lower end thereof to said base assembly and extending upwardly to a position above the typewriter,
    said support column having vertically spaced upper and lower end sections, and a generally horizontally extending section disposed between and interconnecting said end sections,
    said lower end section defining a blind bore adapted to nestingly receive the upper end of said pivot pin for pivotally mounting said column upon said base assembly, and said upper end section being telescopically and pivotably connectable to an easel-like support platform fabricated of a molded polymeric material,
    said support platform including a support portion extending outwardly therefrom and underlying and supporting worksheets which are to be copied with the typewriter.

* * * * *